United States Patent
Kim et al.

(10) Patent No.: US 12,010,616 B2
(45) Date of Patent: Jun. 11, 2024

(54) CONTROLLING MIMO LAYERS FOR UE POWER SAVING

(71) Applicant: Apple Inc., Cupertino, CA (US)

(72) Inventors: Yuchul Kim, Santa Clara, CA (US); Haitong Sun, Irvine, CA (US); Wei Zeng, San Diego, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 418 days.

(21) Appl. No.: 16/564,018

(22) Filed: Sep. 9, 2019

(65) Prior Publication Data

US 2020/0100178 A1 Mar. 26, 2020

Related U.S. Application Data

(60) Provisional application No. 62/736,336, filed on Sep. 25, 2018.

(51) Int. Cl.
| | |
|---|---|
| *H04W 52/02* | (2009.01) |
| *H04B 7/0456* | (2017.01) |
| *H04W 72/23* | (2023.01) |
| *H04W 76/10* | (2018.01) |
| *H04W 76/28* | (2018.01) |
| *H04W 72/044* | (2023.01) |

(52) U.S. Cl.
CPC ........ *H04W 52/0212* (2013.01); *H04B 7/046* (2013.01); *H04W 52/0203* (2013.01); *H04W 72/23* (2023.01); *H04W 76/10* (2018.02); *H04W 76/28* (2018.02); *H04W 72/0466* (2013.01)

(58) Field of Classification Search
None
See application file for complete search history.

(56) References Cited

U.S. PATENT DOCUMENTS

| | | | |
|---|---|---|---|
| 7,120,199 B2 | 10/2006 | Thielecke | |
| 8,670,499 B2 | 3/2014 | Perets | |
| 10,212,724 B2 | 2/2019 | Schober | |
| 2015/0318907 A1* | 11/2015 | Zhang | H04B 7/0645 |
| | | | 375/267 |
| 2017/0019820 A1* | 1/2017 | Das | H04W 36/0016 |

(Continued)

FOREIGN PATENT DOCUMENTS

| | | | |
|---|---|---|---|
| CN | 108141789 | 6/2018 | |
| WO | WO-2018084971 A1 * | 5/2018 | H04B 7/0473 |

(Continued)

OTHER PUBLICATIONS

Intel Corporation, "Codeword to MIMO layer mapping and overhead reduction", Apr. 2017, 3GPP Draft, R1-1704717, pp. 1-3 (Year: 2017).*

Intel Corporation; "Codeword to MIMO layer mapping and overhead reduction"; 3GPP Draft; R1-1704717; 3rd Generation Partnership Project (3GPP); Mobile Competence Centre, 650, Route Des Lucioles, F-06921 Sophia-Antipolis Cedex, France; vol. RAN WG1, No. Spokane, USA; Apr. 2, 2017; three pages.

(Continued)

*Primary Examiner* — Adnan Baig
(74) *Attorney, Agent, or Firm* — Kowert, Hood, Munyon, Rankin & Goetzel, P.C.

(57) ABSTRACT

This disclosure relates to techniques for dynamically adjusting a number of active receiver chains of a wireless device. Based on communication parameters exchanged with a base station, a device may determine a maximum number of receiver chains needed for data reception during one or more time periods. Such dynamic adjustment may enable power savings.

20 Claims, 10 Drawing Sheets

(56) References Cited

U.S. PATENT DOCUMENTS

| | | | |
|---|---|---|---|
| 2018/0248581 A1* | 8/2018 | Chae | H04W 8/22 |
| 2018/0249366 A1 | 8/2018 | Takahashi | |
| 2018/0270799 A1 | 9/2018 | Noh | |
| 2019/0074885 A1* | 3/2019 | Chen | H04B 7/0478 |
| 2019/0090299 A1* | 3/2019 | Ang | H04L 5/003 |
| 2019/0215729 A1* | 7/2019 | Oyman | H04L 65/80 |
| 2019/0342890 A1* | 11/2019 | Tong | H04W 8/24 |
| 2020/0252180 A1* | 8/2020 | Takeda | H04W 72/12 |
| 2021/0273758 A1* | 9/2021 | Liu | H04L 5/005 |

FOREIGN PATENT DOCUMENTS

| | | |
|---|---|---|
| WO | WO 2018084971 A1 | 5/2018 |
| WO | 2018130115 | 7/2018 |

OTHER PUBLICATIONS

Spreadtrum Communications; "Considerations on DMRS for CP-OFDM"; 3GPP Draft; R1-1707784; 3rd Generation Partnership Project (3GPP), Mobile Competence Centre, 650, Route Des Lucioles, F-06921 Sophia-Antipolis Cedex, France; vol. RAN WG1, No. Hangzhou, China; May 14, 2017; six pages.

Extended European Search Report, European Patent Application No. 19197436.9, mailed Jan. 27, 2020, 10 pages.

Notice of Allowance for Chinese Patent Application No. 2019108696809; Aug. 31, 2023.

Intel Corporation "Views on the number of Tx/Rx antenna ports and MIMO layers for FR2 UEs"; 3GPP TSG-RAN WG4 Meeting #86 R4-1801760; Feb. 26, 2018.

* cited by examiner

CONTROLLING MIMO LAYERS FOR UE POWER SAVING

PRIORITY CLAIM

This application claims priority to U.S. provisional patent application Ser. No. 62/736,336, entitled "Controlling MIMO Layers for UE Power Saving," filed Sep. 25, 2018, which is hereby incorporated by reference in its entirety as though fully and completely set forth herein.

FIELD

The present application relates to wireless devices, and more particularly to systems, methods, and apparatuses for reducing power consumption by opportunistically depowering one or more receiver chains.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), 5G New Radio (NR), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Mobile electronic devices may take the form of smart phones or tablets that a user typically carries. Wearable devices (also referred to as accessory devices) are a newer form of mobile electronic device, one example being smart watches. Typically, mobile electronic devices have relatively limited energy storage capabilities, e.g., battery capacity. In general, it would be desirable to reduce the power requirements of communication devices, including both wearable devices and more traditional wireless devices such as smart phones. For example, powering a larger number of receiver chains for multi-layer communication may result in greater power use than powering a smaller number of receiver chains. Therefore, improvements in the field are desired.

SUMMARY

Embodiments are presented herein of, inter alia, systems, methods, and apparatuses for reducing power requirements of a wireless device by opportunistically depowering one or more receiver chains.

A wireless device may comprise a plurality of receiver chains which may be used for receiving information using one or more wireless technologies. In some embodiments, the plurality of receiver chains may be configured for multiple-input, multiple-output (MIMO) communication. Each of the plurality of receiver chains may be configured to be separately powered down.

The wireless device may exchange communication parameters with a base station. Based on the communication parameters, and possibly other factors such as one or more inactivity timers, the wireless device may dynamically determine a maximum number of MIMO layers. The wireless device may adjust a number of active receiver chains based on the number of MIMO layers.

Note that the techniques described herein may be implemented in and/or used with a number of different types of devices, including but not limited to, base stations, access points, cellular phones, portable media players, tablet computers, wearable devices, and various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
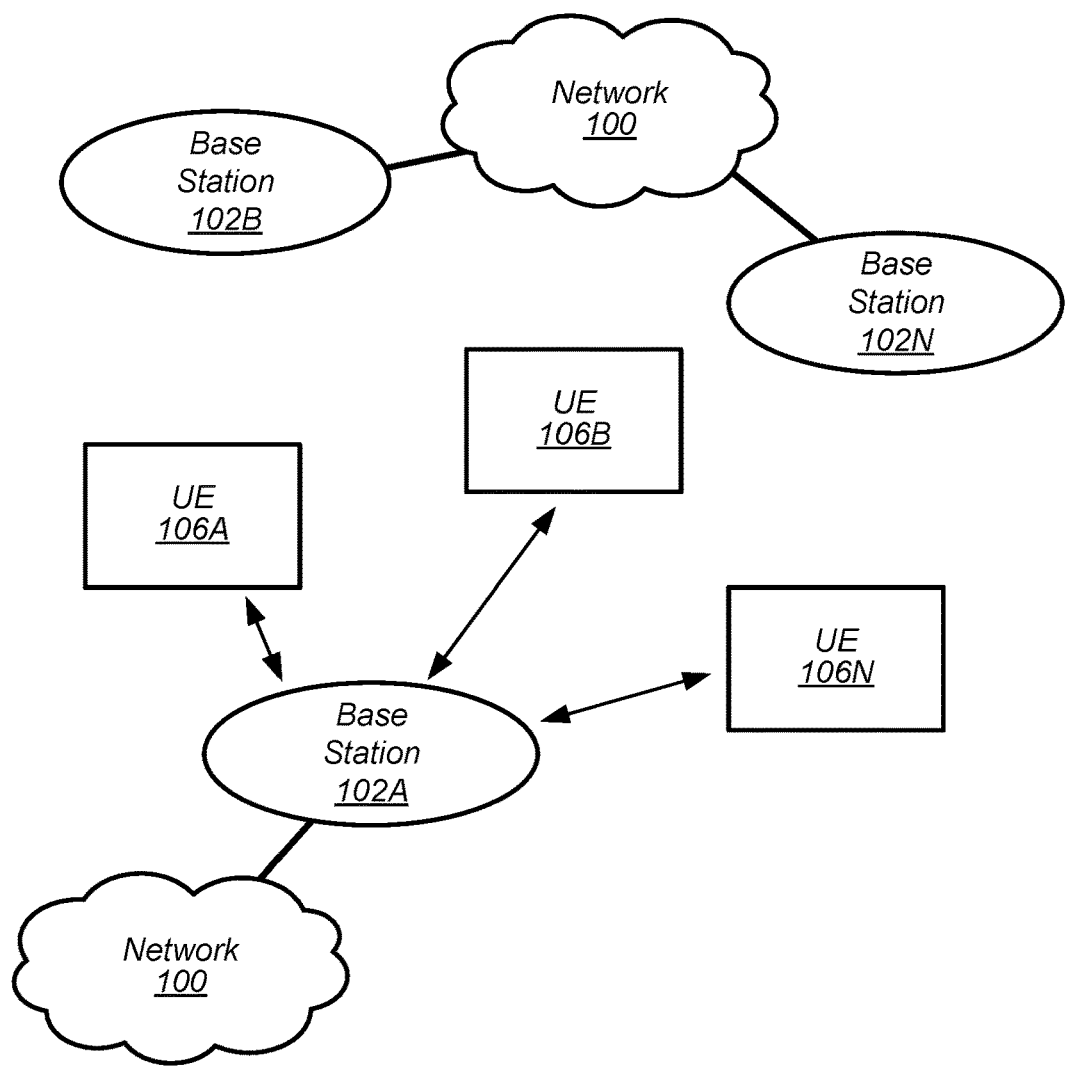
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Base Station—The term "Base Station" has the full breadth of its ordinary meaning, and at least includes a wireless communication station installed at a fixed location and used to communicate as part of a wireless telephone system or radio system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to a hardware limitation of the device, e.g., its size, battery power, and/or transmit/receive power. For example, a smart watch that is communicating over NR, LTE or LTE-A with a base station may be inherently link budget limited due to its reduced transmit/receive power and/or reduced antenna, e.g., relative to those of a smart phone. Wearable devices, such as smart watches, are generally link budget limited devices. Alternatively, a device may not be inherently link budget limited, e.g., may have sufficient size, battery power, and/or transmit/receive power for normal communications over NR, LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
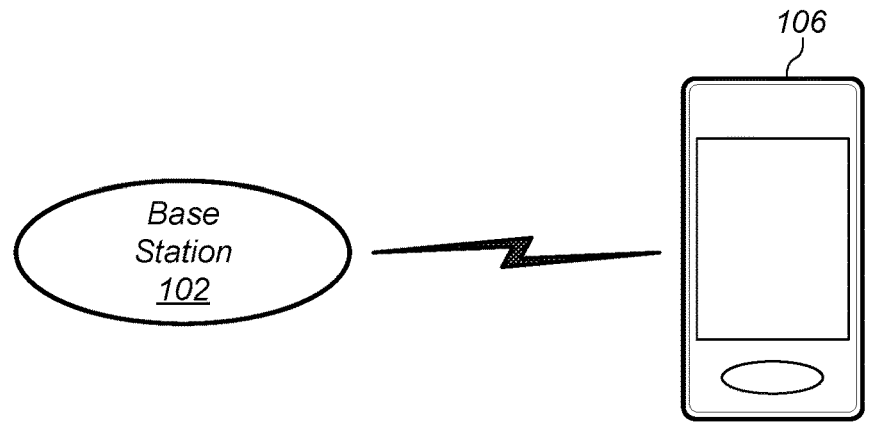
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 5G NR, HSPA 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., NR, GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas and one or more radios for communicating using one or more wireless communication protocols or technologies. In one embodiment, the UE 106 might be configured to communicate using one or more of NR, CDMA2000 (1×RTT/1× EV-DO/HRPD/eHRPD), or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above. Further, in some embodiments, the UE 106 may comprise multiple receiver chains, e.g., for MIMO communication.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using any of NR, LTE, and/or 1×RTT (or UMTS or GSM), and separate radios for communicating using each of Wi-Fi and Bluetooth. Other configurations are also possible.

Figure 3:
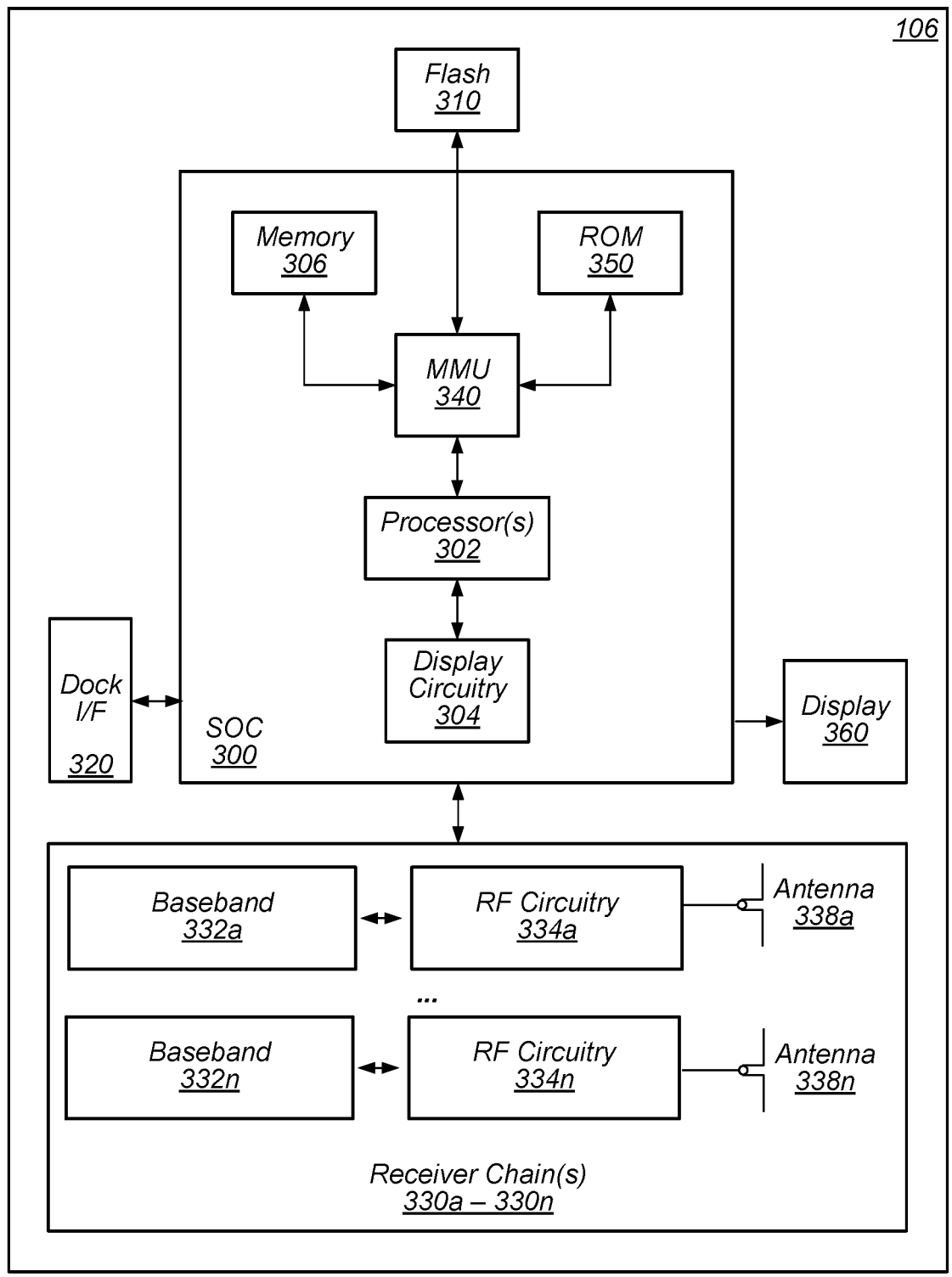
FIG. 3 illustrates an exemplary block diagram of a UE device, according to some embodiments.

FIG. 3—Exemplary Block Diagram of a UE Device

FIG. 3 illustrates one possible block diagram of a UE device, such as UE device 106. As shown, the UE device 106 may include a system on chip (SOC) 300, which may include portions for various purposes. For example, as shown, the SOC 300 may include processor(s) 302 which may execute program instructions, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310). The MMU 340 may be configured to perform memory protection and page table translation or set up. In some embodiments, the MMU 340 may be included as a portion of the processor(s) 302.

The UE device 106 may also include other circuits or devices, such as the display circuitry 304, receiver chains 330, dock/connector I/F 320, and/or display 340.

In the embodiment shown, ROM 350 may include a bootloader, which may be executed by the processor(s) 302 during boot up or initialization. As also shown, the SOC 300 may be coupled to various other circuits of the accessory device 107. For example, the UE device 106 may include various types of memory, a connector interface 320 (e.g., for coupling to a computer system), the display 360, and wireless communication circuitry/receiver chain(s) 330 (e.g., for communication using cellular, Wi-Fi, Bluetooth, NFC, GPS, etc.). In some embodiments, one or more of wireless communication circuitry/receiver chain(s) 330 may perform both send (e.g., transmission) and receive functions.

The UE device 106 may include at least one receiver chain 330 (e.g., receiver chain 330a, as illustrated), and in some embodiments multiple receiver chains (e.g., including any number of receiver chains 330b-330n), for performing wireless communication with base stations and/or other devices. UE device 106 may perform communications with base stations and other devices implementing different wireless technologies in some embodiments. In particular, UE device 106 may employ multiple receiver chains 330a-330n for MIMO communications, e.g. using cellular. Each receiver (Rx) chain 330a-330n may include baseband circuitry 332 and RF processing circuitry 334, and an antenna 338, among various possibilities. In some embodiments, some components may be shared between multiple receiver chains. For example, the baseband circuitry may be implemented as a shared processor handling multiple Rx chain signals simultaneously. In some embodiments, not all illustrated components of a receiver chain 330a-330n may be included. Individual receiver chains may be separately powered, e.g., so that one subset of receiver chains 330 may be powered or active while another subset may be depowered or inactive. Note that the term depowered as used herein may include a variety of possible states, including low power states, fully depowered states, sleep states, etc. Additionally, the receiver chains may be configured so that individual elements/components of a receiver chain may be separately powered or depowered. For example, in some embodiments it may be possible to more quickly power/depower one element (e.g., baseband processor 332) relative to other components of the receiver chain; e.g., a baseband processor 332 may have a shorter "power-off time" or "cycle time" than the other elements. Thus, under some circumstances, an opportunity may exist to save power by temporarily depowering one or more elements without depowering the remainder of the chain (e.g., because the amount of time to depower and repower the remaining components may exceed the amount of time before those components may be needed). In other words, specific elements may be selected to power off based on a comparison of the power-off time and a transmission time interval (TTI) associated with an active communication session. In some embodiments, a single receiver chain may include multiple antennas.

For example, the UE device 106 may use antenna(s) 338 to perform wireless communication. As noted above, the UE may in some embodiments be configured to communicate wirelessly using a plurality of wireless communication standards or radio access technologies (RATs).

As described herein, receiver chain(s) 330 may include hardware and software components for implementing embodiments of this disclosure. The receiver chain(s) 330 of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

The receiver chains 330 may also include elements such as Wi-Fi Logic and Bluetooth Logic that are not illustrated. The Wi-Fi Logic may enable the UE device 106 to perform Wi-Fi communications on an 802.11 network. The Bluetooth Logic may enable the UE device 106 to perform Bluetooth communications.

As described further subsequently herein, the UE 106 may include hardware and software components for implementing features for controlling a number of active receiver chains 330, such as those features described herein with reference to, inter alia, FIG. 6. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components may be configured to

Figure 4:
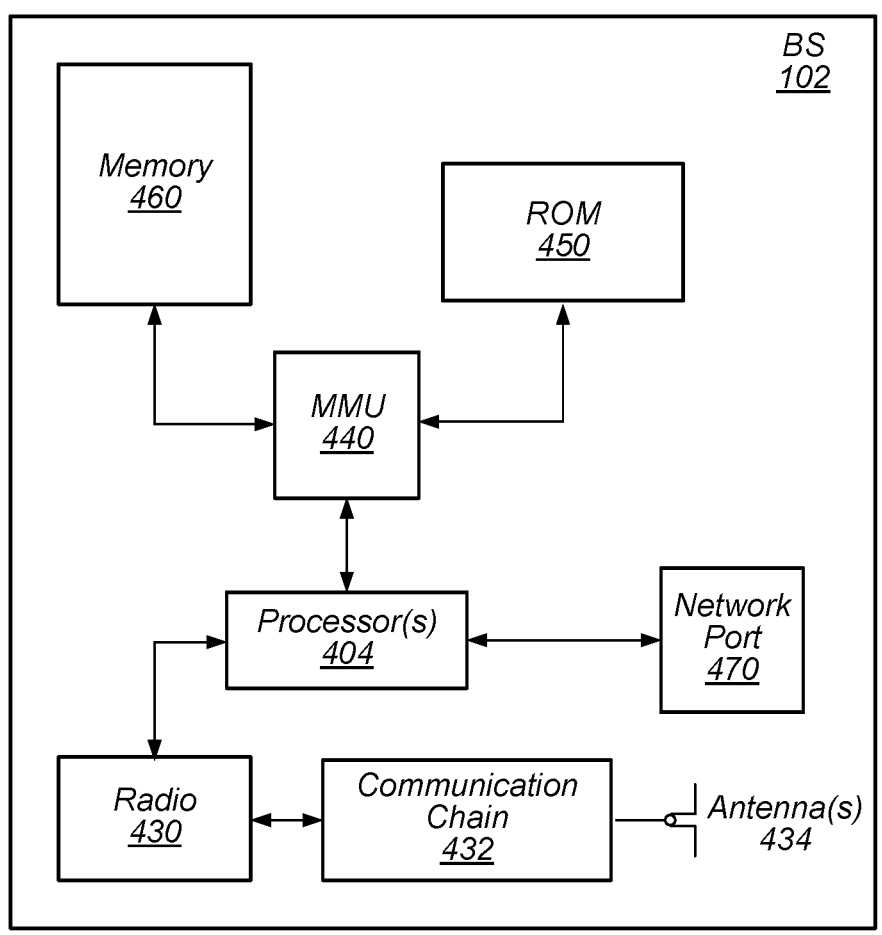
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, NR, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an NR radio for performing communication according to NR as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., NR, LTE and Wi-Fi). The BS 102 may be referred to as a gNB.

The BS 102 may be configured to communicate according to MIMO techniques. For example, the BS 102 may use multiple antennas 434 to communicate with UE 106 using its one or more transmit chains and/or receiver chains 330a-330nnn. For example, there may be one or more transmit chains and/or receiver chains contained within the communication chain 432. Technical standards may describe a variety of modes for communication between these devices, e.g., LTE standards may describe various transmission modes (TM) which may specify different transmission schemes for physical downlink shared channel (PDSCH) messages. For example, TM1 may utilize only a single antenna, while other (e.g., higher numbered) modes may utilize additional antennas. One or more physical downlink control channel (PDCCH) messages may include control information. The control info may include an allocated rank (e.g., rank indication or RI) and modulation and coding scheme (MCS). The nature of the control information may differ between different transmission modes. For example, according to TM3 and TM4, a pre-coding matrix indicator (PMI), may be included, but according to TM9, PMI may not be included.

The BS 102 may include hardware and software components for implementing or supporting implementation of features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein.

Figure 5:
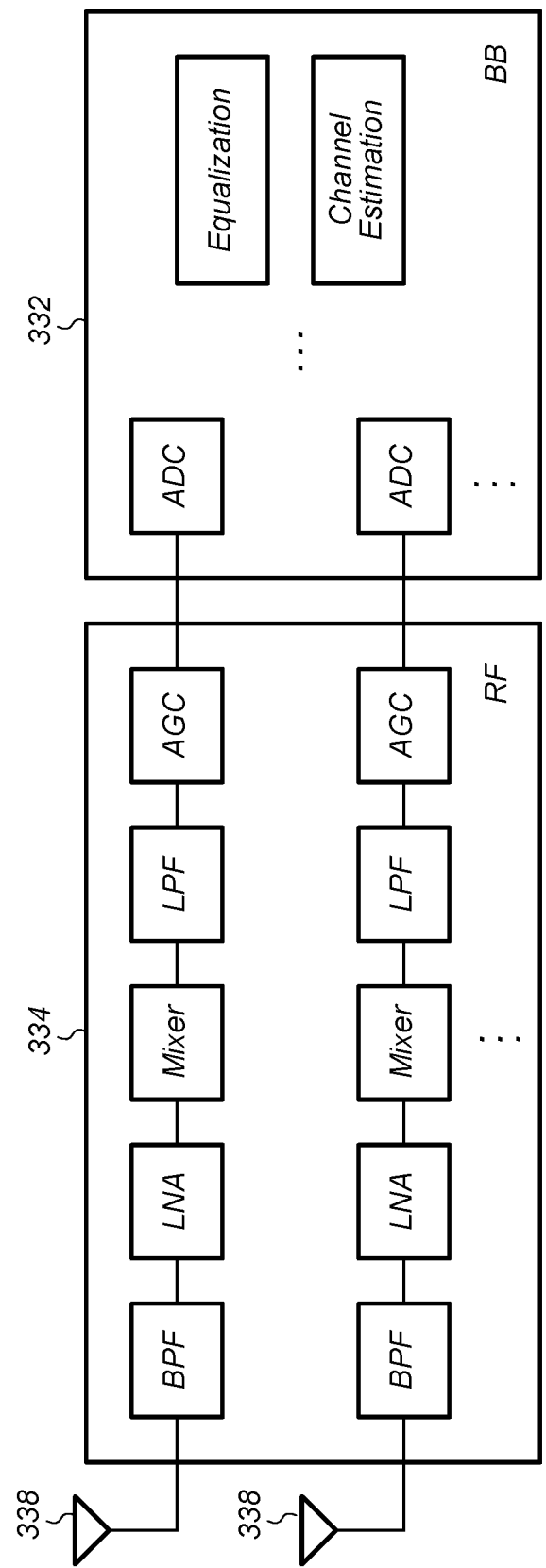
FIG. 5 illustrates an exemplary block diagram of receiver chains of a UE, according to some embodiments.

FIG. 5—Exemplary Block Diagram of Receiver Chains of a Wireless Device

FIG. 5 is a block diagram illustrating an exemplary set of receiver chains (e.g., receiver chains 330) of a wireless device (such as one of the UEs 106 illustrated in FIGS. 1-3). It should be noted that the exemplary details illustrated in and described with respect to FIG. 5 are not intended to be limiting to the disclosure as a whole: numerous variations and alternatives to the details provided herein below with respect to FIG. 5 are possible and should be considered within the scope of the disclosure.

As illustrated, the UE 106 (e.g., receiver chains 330) may include an RF portion 334 and a baseband (BB) portion 332. The RF portion 334 may be connected to one or more antennas 338. In some embodiments, the UE may include multiple RF portions 334 and/or multiple BB portions 332. Either or both of RF 334 and BB 332 may include elements of one or more receiver (Rx) chains 330. Further, either or both of RF 334 and BB 332 may include elements of one or more transmitter chains. Receiver and transmitter (Tx) chains may share some or all elements, or may be entirely independent (e.g., may not share any elements). In the illustrated example, two Rx chains are shown, but it will be appreciated that any number of Rx chains are possible.

A receiver chain may comprise one antenna and various elements within the RF 334 and BB 332. As illustrated, a receiver chain may include the following elements in RF 334: a band pass filter (BPF), low noise amplifier (LNA), mixer, low pass filter (LPF), and automatic gain control (AGC). The RF components of a receiver chain may be a single integrated circuit (IC), according to some embodiments. An RF IC may include multiple parallel chains of signal processing blocks (e.g., the illustrated elements and/or additional or alternative elements). Each chain may correspond to one physical antenna.

The features of the receiver chain included in BB 332 may vary in different embodiments. The receiver chain may also include an analog to digital converter (ADC), which may be included in BB 332. It should be noted that the ADC may be included in RF 334 rather than BB 332, according to some embodiments. The BB 332 may include one or more elements (or perform logical functions corresponding to such elements) that may be shared between any number of Rx chains. For example, as illustrated, BB 332 may include equalization and channel estimation functions, which may be performed for any number of corresponding signals (e.g., Rx chains) using shared or dedicated processing and/or memory. Further functions of BB 332 may include signal buffering; the BB 332 may perform buffering for any number of signals/Rx chains using shared or dedicated processing and/or memory. The BB 332 may include multiple paths of signal processing chain (e.g., Rx chain). Note that in some embodiments of BB 332, the Rx chain could be a logical concept. In other words, the BB 332 may be shared processing circuitry which may be configured to handle multiple Rx chain signals simultaneously.

In some embodiments, one antenna may correspond to one Rx chain (e.g., one IC) in RF 334. The Rx chain may further include an ADC, which may be included in BB 332 or RF 334. The Rx chain may include any number of ICs performing RF and/or BB functions.

In some embodiments, multiple antennas may correspond to one Rx chain or multiple Rx chains may correspond to a single antenna. In some embodiments, an antenna switch block may be included to switch or modify the connections between one or more antennas and one or more Rx chains. In some embodiments, some or all components of RF 334 may be shared by one or more Rx chains.

A UE 106 may be configured to power or depower one or more receiver chains independently. Depowering a receiver chain may include powering off LNA, mixer, BPF, and LPF, among various possibilities. Depowering a receiver chain may further include reducing the use of ADC, signal buffering, channel estimation, and equalization, e.g., in shared BB processing circuitry. Further, reducing the number of active receiver chains may reduce the use of memory, processors, or other shared resources, which may further reduce power consumption. Such reduced use may reduce the power consumption of shared circuitry.

Figure 6:
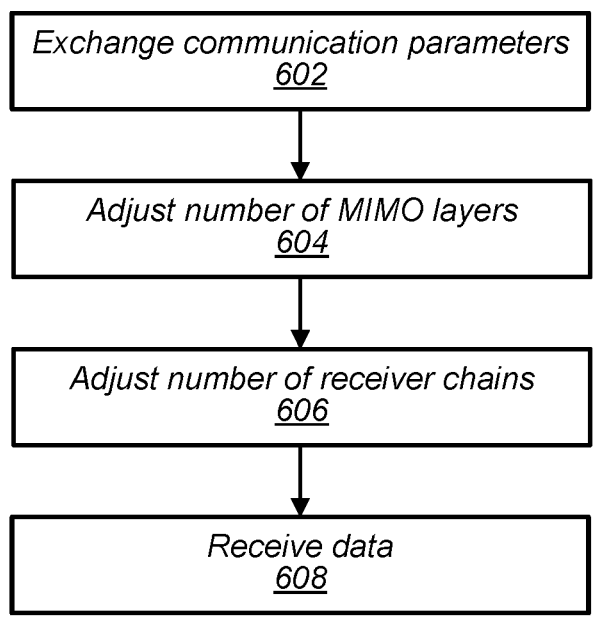
FIG. 6 is a flowchart diagram illustrating an exemplary method for controlling a number of receiver chains, according to some embodiments.

FIG. 6—Flowchart Diagram of Receiver Chain Depowering

In some embodiments, a wireless device (e.g., UE 106) may have a limited power supply (e.g., a battery). Further, extended battery life may be a valuable feature to the user of the device. Powering each receiver chain may incur a significant power demand. Accordingly, depowering as many receiver chains as possible, when those chains are unused or under-used, may extend the battery life of the device.

According to some technical specifications, e.g., NR, the number of antennas and/or receiver chains utilized to receive data may vary over time. For example, multiple-input, multiple-output (MIMO) communication-capable UE devices may use up to eight antennas and/or receiver chains, among various possibilities. ABS 102 may use a variety of techniques to transmit data to a UE; these techniques may require different numbers of active (e.g. powered) receiver chains for the UE (e.g., UE 106) to successfully receive and decode the data. For example, in MIMO communications, transmissions from the BS 102 may include various numbers of MIMO layers. The UE may use one receiver chain (and a corresponding antenna) to receive each transmitted MIMO layer. In current NR, a network may support up to 8 MIMO layers, for single user MIMO (SU-MIMO), according to some embodiments. It should be noted that the techniques described herein may be applied to other numbers of layers and other types of transmissions, e.g., MU-MIMO.

During radio resource control (RRC) configuration, a maximum number of MIMO layers to be supported may be determined based on a number of codewords (e.g., and/or the related concept of transport blocks) supported by the UE, according to some embodiments. For example, the number of codewords may be indicated by a parameter called maxNrofCodeWordsScheduledByDCI. If maxNrofCodeWordsScheduledByDCI=1, then network may send up to 4 layer(s) for a single codeword during a transmission time interval (TTI) for which the parameter is applicable. If maxNrofCodeWordsScheduledByDCI=2, then network may send up to 8 layer(s) for two codewords during the TTI. In other words, the network may send 1-4 layers for codeword 1 and layers 5-8 for codeword 2 (e.g., up to a first 4 layers may be transmitted for a first codeword and up to a second 4 layers may be transmitted for a second codeword). For example, if 5 layers are transmitted, layers 1-4 may be for codeword 1 and layer 5 may be for codeword 2. In some embodiments, this maxNrofCodeWordsScheduledByDCI parameter, and corresponding maximum number of MIMO layers, may remain in effect for the duration of the RRC connection. This maximum number of layers may accordingly be referred to as a static maximum.

For a UE in RRC-Connected mode, the actual (as opposed to maximum) number of MIMO layers may be dynamically indicated and adjusted by downlink control information (DCI) transmitted during a physical downlink control channel (PDCCH) for a physical downlink shared channel (PDSCH). For example, an "Antenna port field" value in DCI may indicate how many MIMO layers are transmitted for corresponding PDSCH. If maxNrofCodeWordsScheduledByDCI=1, then the network/BS may indicate one of 1, 2, 3, or 4 layer(s) to transmit a single codeword. If maxNrofCodeWordsScheduledByDCI=2, then network can indicate one of 5, 6, 7, or 8 layer(s) to transmit two codewords. These numbers of layers and codewords are exemplary only, and other numbers may be used.

Note that as the number of MIMO layers to be supported increases, the UE power consumption may increase (e.g., because each active Rx chain may use power). The UE (e.g., modem) may take time for decoding DCIs. For example, DCI decoding may end around the $5^{th}$-$9^{th}$ orthogonal frequency-division multiplexing (OFDM) symbol in a slot. Until DCI decoding finishes, the UE may not know how many MIMO layers are being transmitted for the potential PDSCH in the slot. Thus, the UE may turn on multiple receiver chains to process received signal samples corresponding to a maximum number of layers it could support (e.g., according to RRC configuration via maxNrofCodeWordsScheduledByDCI) instead of based on the actual number of MIMO layers being transmitted. Thus, the UE may consume a significant amount power for processing signal samples which may not be actually used for the UE. For instance, when only two layers are scheduled with a maximum number of layers equal to 4 layers (e.g., 1 codeword), the UE may buffer all 4 layers of streams until the UE finishes DCI decoding (to determine the actual number of layers scheduled). Accordingly, there may be significant power saving benefits to turning off any unneeded receiver components or circuitry as early as possible during a slot.

FIG. 6 illustrates a method for controlling the number of MIMO layers and accordingly selectively powering and depowering receiver chains, according to some embodiments. In various embodiments, some of the elements of the method shown may be performed concurrently, in a different order than shown, may be substituted for by other method elements, or may be omitted. Additional method elements may also be performed as desired. Aspects of the method of FIG. 6 may be implemented by a wireless device, such as the UEs 106 and/or BS 102 illustrated in and described with respect to the preceding Figures, or more generally in conjunction with any of the computer systems or devices shown in the Figures, among other devices, as desired. For example, one or more processors of a UE 106 and/or BS 102 (e.g., such as processors 302, one or more processors included in receiver chains 330, processors 404, etc.) may cause such a device to perform any or all of the aspects of the method of FIG. 6, according to some embodiments. Note that while at least some elements of the method of FIG. 6 are described in a manner relating to the use of communication techniques and/or features associated with 3GPP specification documents, such description is not intended to be limiting to the disclosure, and aspects of the method of FIG. 6 may be used in any suitable wireless communication system, as desired. For example, although aspects of the method of FIG. 6 are described relating to MIMO communications in NR, it should be noted that the method may apply to other types of communications and wireless networks. Further, although aspects of the method of FIG. 6 are described relating to downlink transmission, it should be noted that the method may apply to uplink transmission as well. As shown, the method may operate as follows.

A UE (e.g., UE 106) may establish communication with a base station (e.g., BS 102) and exchange one or more communication parameters with the BS (602), according to some embodiments. The BS may provide one or more cells of a (e.g., cellular) wireless network and the UE may communicate with the base station using NR and/or other radio access technologies. In some embodiments, the BS may provide a WLAN network, e.g., according to 802.11.

The UE and BS may be configured to communicate using MIMO. The one or more communication parameters may be usable by the UE and/or BS to determine how many MIMO layers may be used for communication during one or more time periods, among various possibilities. The UE may use any number of transmitter and/or receiver chains to exchange communication parameters (and possibly other data) with the BS. For example, the UE and BS may exchange application and/or control data in the uplink and/or downlink directions.

The UE and BS may perform configuration, e.g., RRC configuration. For example, the UE may indicate (e.g., to the BS) how many codewords it supports and/or the BS may indicate (e.g., to the UE) a maximum number of MIMO layers. Such indications may be communicated in any way, e.g., by sending corresponding messages between the UE and BS. The BS may explicitly indicate a first maximum number of MIMO layers based on the number of codewords (e.g., via maxNrofCodeWordsScheduledByDCI).

In some embodiments, the BS may determine and indicate a second (or third, etc.) maximum number of MIMO layers or adjust the first maximum based on additional information. Such second (and possibly subsequent) or adjusted maximum numbers of MIMO layers may be used to dynamically restrict/adjust the maximum number of MIMO layers in effect to more closely match the number of MIMO layers that the BS is likely to transmit to the UE in upcoming time periods/slots. Such adjustments to the maximum may be determined based on various additional factors, e.g., channel conditions, preferences of the UE, etc., and may be explicitly or implicitly indicated in various ways as explained below. The adjusted/second and subsequent maximum number of MIMO layers may be less than or equal to the first maximum number of layers. For example, if the first maximum is 8 layers (e.g., because two codewords are enabled), the BS may determine a dynamic adjustment to the maximum in order to adjust the maximum to 6 layers in response to channel conditions. If channel conditions improve, the BS may further determine an adjustment the maximum back to 8 layers. As an alternative example, if the first maximum is 8 layers (e.g., because two codewords are enabled), the BS may set a conditional maximum of 4 layers, e.g., to use based on an inactivity timer, e.g., during CDRX on durations. The BS may indicate to the UE to use such a conditional maximum when the condition(s) (e.g., expiration of the inactivity timer) is (are) satisfied. Any such dynamically adjusted or conditional maximum may be referred to as an adjusted maximum, configured maximum, or second maximum, among various possibilities and/or may be referred to as making an adjustment to the (e.g., first) maximum.

In some embodiments, the BS may, via the one or more communication parameters, configure the UE to use one or more bandwidth parts (BWP). A bandwidth part may be a contiguous region of frequency/spectrum that the UE may monitor for transmissions from the BS. The BS may configure the UE to use one or multiple BWPs concurrently. The BS may dynamically change the assignment of BWPs to the UE, e.g., via RRC signaling, via one or more media access control (MAC) control elements (CE) or via Downlink Control Information (DCI). A BWP assignment may last until it is reconfigured, or may remain in effect for a preconfigured amount of time.

In some embodiments, specific BWPs may be defined to use specific maximum numbers of MIMO layers. For example, a configuration of $BWP_k$ may include a configured maximum number of MIMO layers to be supported on that BWP (e.g., $N_{max\_L\_k}$). For example, for 1 codeword, $N_{max\_L\_k}$ could be 1-4. For 2 codewords, $N_{max\_L\_k}$ could be 1-8. Alternatively, for 2 codewords, $N_{max\_L\_k}$ could be limited to 5-8, according to some embodiments. Other values are possible. The actual number of layers to be transmitted may be limited by $N_{max\_L\_k}$ in $BWP_k$. This may allow the UE turn on only $N_{max\_L\_k}$ receiver chains to receive up to $N_{max\_L\_k}$ layers in $BWP_k$ or to depower receiver chains so that only $N_{max\_L\_k}$ receiver chains are powered. In other words, the UE may be able to determine how many receiver chains may be used based on an assigned BWP. Thus, for as long as the UE is assigned to $BWP_k$, the UE may use $N_{max\_L\_k}$. Such an assignment may remain in effect for any number of slots. In other words, $N_{max\_L\_k}$ may be a conditional maximum for a UE assigned to $BWP_k$.

Some example BWP configurations are enumerated below. Note that these configurations are exemplary only and that other configurations may be used.

A first BWP, BWP1, may be a default or initial (narrow) BWP with $N_{max\_L\_k}$=1. A UE may use and/or switch to this default BWP when a BWP inactivity timer expires, e.g., when there was no traffic arrival for a duration of an inactivity timer. In this case, UE may monitor mainly or only for control signals. In order to save power, UE may operate with small number of receive chains, e.g., 1 receive chain in the illustrated example.

BWP2 may be a medium size BWP with $N_{max\_L\_k}=2$. This BWP may be used when traffic arrival is moderate, e.g., for VoLTE or web browsing.

BWP3 may be a large size BWP with $N_{max\_L\_k}=2$. This BWP may be used when there are only a few users in the cell, and network can assign enough resources to a UE in low signal to noise ratio (SNR) conditions. In other words, this BWP may be used near a cell edge where more energy per layer may be helpful for reception.

BWP4 may be a large size BWP with $N_{max\_L\_k}=6$. This BWP may be used when there is heavy traffic arrival such as FTP or video streaming for UE in high SNR conditions. In other words, this BWP may be used in a high SNR region (e.g., near a cell center) where more layers may provide higher throughput.

In some embodiments, the one or more communication parameters may include a parameter for the maximum number of layers to receive during a connected mode discontinuous reception (CDRX) on duration. Such a parameter may be referred to as $N_{CDRX\_L}$. Thus, $N_{CDRX\_L}$ may be a conditional maximum for a UE operating in a CDRX on duration. In other words, while operating in CDRX mode in a BWP, the maximum number of layers may be limited to $N_{CDRX\_L}$. In some embodiments, the maximum number of layers may be determined based on the lower of $N_{CDRX\_L}$ or the maximum number of layers for the UE's current BWP, e.g., $N_{max\_L\_k}$. In other words, the number of layers may be given by: $\min(N_{CDRX\_L}, N_{max\_L\_k})$. In other embodiments, the maximum number of layers may be determined based on the lower of $N_{CDRX\_L}$ or the number of layers associated with the number of supported code words (e.g., 4 for 1 codeword, 8 for 2 codewords). In other words, maximum layers may be given by: $\min(N_{CDRX\_L}, 4 \text{ or } 8$—depending on number of codewords). $N_{CDRX\_L}$ may be configured by RRC or by MAC CE.

In some embodiments, the communication parameters may include a dynamic indication of a maximum number of MIMO layers. Such a dynamic indication may be may be more flexible than RRC signaling (e.g., which may be limited to indicating a maximum of 4 layers for 1 codeword or 8 layers for 2 codewords, as noted above). For example, such a dynamic indication may be accomplished through MAC CE signaling, among various possibilities. Thus, the number of MIMO layers may be changed without changing the BWP. The dynamic signaling may allow for any number of MIMO layers to be selected as a maximum. For example, if 1 codeword is enabled, then 1-4 layers may be indicated; if 2 codewords are enabled, then 1-8 layers may be indicated. The number of layers may vary with channel conditions (e.g., based on channel rank). The number of layers indicated may remain in effect for a fixed period of time, until some condition is met, or until changed. In other words, if a MAC CE indicating a maximum number of layers is received, the UE may use this maximum number for future slots until an indication of a changed number is received or other condition is met.

In some embodiments, the UE may indicate one or more preferred maximum number of layers to the BS. A preferred number of layers may be specific to a BWP. The UE may indicate BWP specific preferred numbers for any number of BWPs. In some embodiments, the UE may indicate a preferred number of layers by indicating a preferred BWP, e.g., which may be associated with a number of layers. A number of layers may be indicated for CDRX operation. These indications may remain in effect for a fixed period of time, until some condition is met, or until changed. The indications may be sent through MAC CE or RRC messages. For example, the UE may transmit the indications as UEAssistanceInformation. The BS (e.g., the network) may not honor the UE's indicated preference for number of layers in some circumstances.

The UE may select the preferred maximum number of layers to indicate to the BS based on any of various considerations. For example, the UE may consider any or all of: measurements of channel conditions taken by the UE, measurements of channel conditions taken by the BS or other devices, rank, motion of the UE, expected traffic to or from the UE, status of any applications executing on the UE, activity of the user, battery level, charging status, connection to (or status of connections with) one or more other RATs or networks, connection to (or status of) a companion or accessory device, congestion, throughput in recent time periods, etc.

In some embodiments, the BS may respond to an indication from the UE of a preferred maximum number of layers. For example, the BS may indicate to the UE that the preferred maximum number of layers will (or will not) be used during one or more time periods.

The UE and/or BS may select a preferred number of layers based on channel conditions, e.g., as determined based on one or more measurements. The measurements may occur on any frequency or combination of frequencies, e.g., including licensed and/or unlicensed spectrum. The communication and measurements may continue (e.g., periodically, randomly, as needed, etc.) for any amount of time. For example, the measurements may occur over any number of slots, subframes and/or symbols. The measurements may include any radio link measurements such as signal-noise ratio (SNR), signal to interference and noise ratio (SINR), reference signal received power (RSRP), reference signal received quality (RSRQ), received signal strength indicator (RSSI), channel quality indicator (CQI), rank indicator (RI), precoding matrix indicator (PMI), etc. The UE and/or BS may retain a history of measurement values. The UE/BS may compare the measurement values, or metrics calculated based on the measured values, to one or more thresholds. The UE/BS may use various parameters, e.g., for hysteresis, in such comparisons. The measurements, thresholds, and/or parameters may be configured by the BS (e.g., by the network) and/or by the UE. The UE and/or BS may report measurement values, comparison results, etc. to each other and/or to the network at any time.

Better channel conditions (e.g., higher measurement values of SNR, RSRP, etc. and/or higher channel rank) may be associated with higher numbers of MIMO layers. For example, a better channel may support more layers. In contrast, under worse channel conditions, devoting more resources (e.g., transmit power, bandwidth, etc.) to a smaller number of layers may achieve better performance, according to some embodiments.

The UE may dynamically determine an adjusted, dynamic, or conditional maximum number of MIMO layers (604), according to some embodiments. The UE may determine the adjusted maximum number of MIMO layers based on the communication parameters exchanged with the BS. The UE may also determine the number of MIMO layers based on other conditions. For example, the UE may use one or more inactivity timers (e.g., in conjunction with the communication parameters) to determine a conditional maximum number of layers in effect at any given time, as explained in more detail below with respect to FIGS. 9 and 10. The UE may use any combination of communication parameters exchanged with the BS and information about other conditions to determine the adjusted number of communication layers. For example, the UE may consider channel conditions in combination with any indications received from the BS.

The UE may adjust a number of active receiver chains (606), according to some embodiments. The UE may determine the (e.g., adjusted) number of receiver chains based on the (e.g., adjusted) number of MIMO layers. For example, the UE may adjust the number of active receiver chains to be equal to the number of MIMO layers. In particular, if the number of active receiver chains is greater than the number of MIMO layers, the UE may depower one or more receiver chains or vice versa.

In some embodiments, the UE may further determine which individual receiver chains to power (e.g., or depower) in order to adjust the number of active receiver chains. For example, based on a determination that the adjusted number of receiver chains is 2, the UE may consult a look up table to determine which 2 receiver chains to power (and correspondingly, which other receiver chains should be depowered).

In some embodiments, the UE may determine not to reduce a number of active receiver chains or not to deactivate all components of a receiver chain based on an amount of time associated with repowering the receiver chains. For example, if communication parameters indicate that a higher number of MIMO layers may be used at a future time, there may not be sufficient time to power off and power back on some or all components of a receiver chain (e.g., if the time to repower the chain or one or more chain components is as long (e.g., within a threshold amount of time) of the time that the chain would be used). Accordingly, the UE may not depower components for which the repower time is too long, relative to the amount of time until the component would be used next.

The UE may receive data (608), according to some embodiments. The UE may use a subset of active receiver chains (e.g., the receiver chains that were not depowered) to receive data from the BS or sending device. The subset of the active receiver chains used to receive the data may be determined based on an actual number of layers indicated in DCI. The subset of the active receiver chains may include some or all of the active receiver chains. The data may include payload data and/or further communication signaling or other control information, among various possibilities. The data may be received in one or more PDSCH messages, among other possibilities, during one or more slots or TTIs.

The UE may further adjust the number of active receiver chains for future time periods based on previously received communication parameters, additional communication parameters (e.g., possibly received as part of the data received in 608), and/or on other factors (e.g., changing conditions, inactivity timers, etc.). The timing of further adjusting the number of active receiver chains may depend on the communication parameters received in 602 and/or on further parameters received in 608, among various possibilities.

In various embodiments, the UE may repower (e.g., power back on) some or all of the depowered receiver chains. Such repowering may occur at a time associated with further downlink data (e.g., based on communication parameters indicating a different number of MIMO layers) and/or may occur periodically. For example, the UE may repower some or all receiver chains after receiving the data and prior to performing any of various measurements e.g., channel state information (CSI) measurement, or maximum supportable rank computation. Alternatively, or under other circumstances, the UE may not repower any receiver chains. Further, the UE may depower additional receiver chains. Thus, in any number of future time periods, the UE may receive further data with different (e.g., larger or smaller) subsets of active receiver chains.

Although the description of the methods relating to FIG. 6 focuses on the UE receiving information, it should be appreciated that the UE may also transmit data. Such transmissions may occur simultaneously, before, or, after any of the actions described herein. The UE may use some or all of the same elements (e.g., antennas) for transmission as well as for reception, or may use different/additional elements. The techniques of FIG. 6 may be applied to transmission as well as reception, or to a combination of transmission and reception functions/chains.

Adjusting the number of receiver chains may require turning on or off of receiver chains (which may include part of RF components and/or component blocks in baseband). This changing may require a certain amount of switching time, which may be referred to as T_mimo_layer_switch. There may be another kind of switching time required to support BWP switching denoted as T_bwp_switch. The BWP switching time, T_bwp_switch, may vary depending on the subcarrier spacing of target BWP and UE processing capability. When BWP switching is involved with MIMO layer switch, the above mentioned two switching times may be considered together. In other words, in selecting what receiver chain(s) (or components of a receiver chain(s)) may be switched off, the UE may consider both the time to switch receiver chains and the time to switch BWPs. For example, the UE may consider the longer of the two switching times. For example, if there is no MIMO layer switching during BWP switching, then the UE may finish BWP switching during a given time T_bwp_switch. However, if BWP switching is involved with MIMO layer switching (e.g., a current BWP's MIMO layer is different from a target BWP's MIMO layer), then the UE may consider the longer switching time (e.g., max(T_mimo_layer_switch, T_bwp_switch)) to finish BWP switching. In other words, if T_mimo_layer_switch is smaller than or equal to T_bwp_switch, then the receiver chain switching time may be considered as equal to T_bwp_switch.

Figure 7:
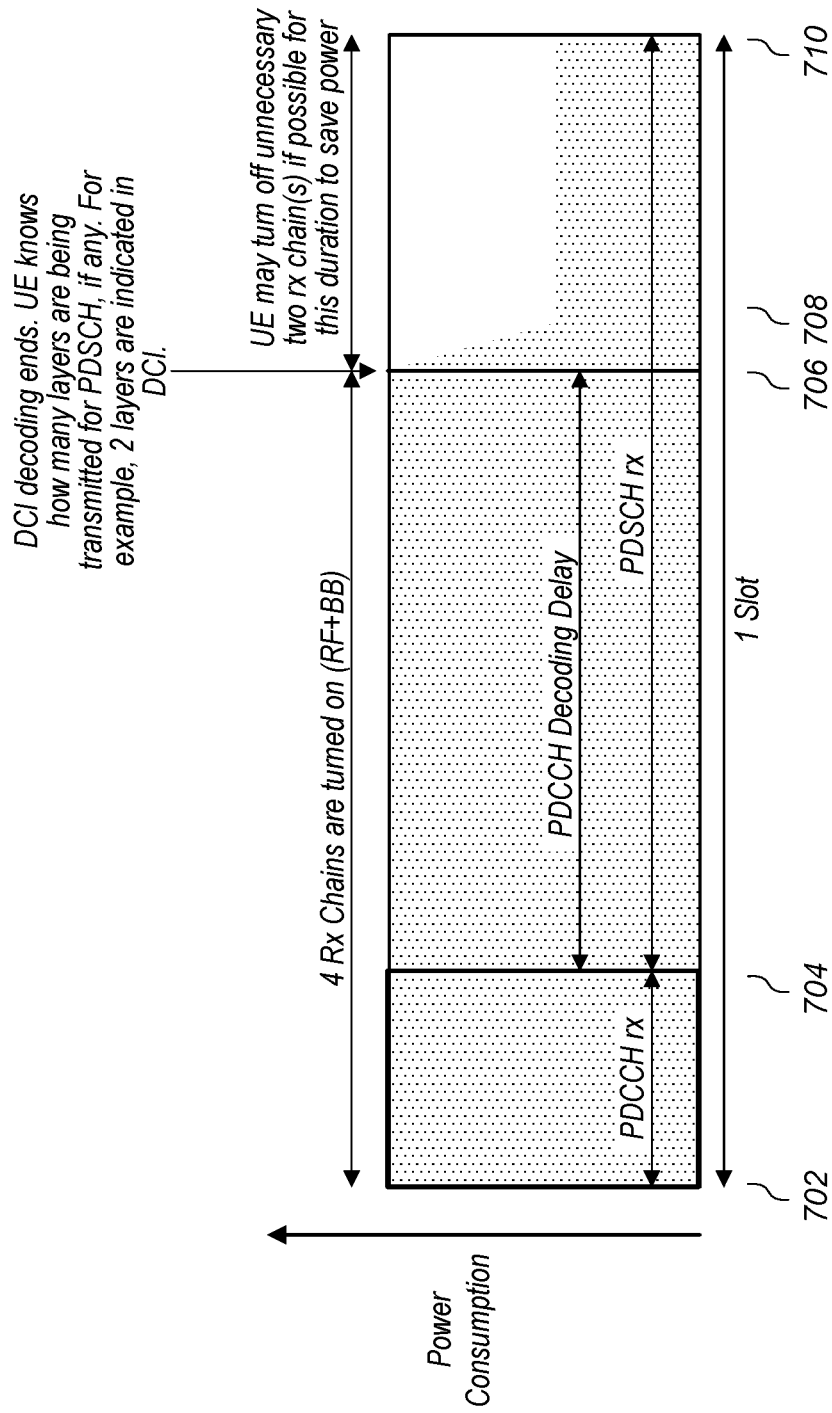
FIGS. 7 and 8 are graphs illustrating power consumption over time, according to some embodiments.
Figure 8:
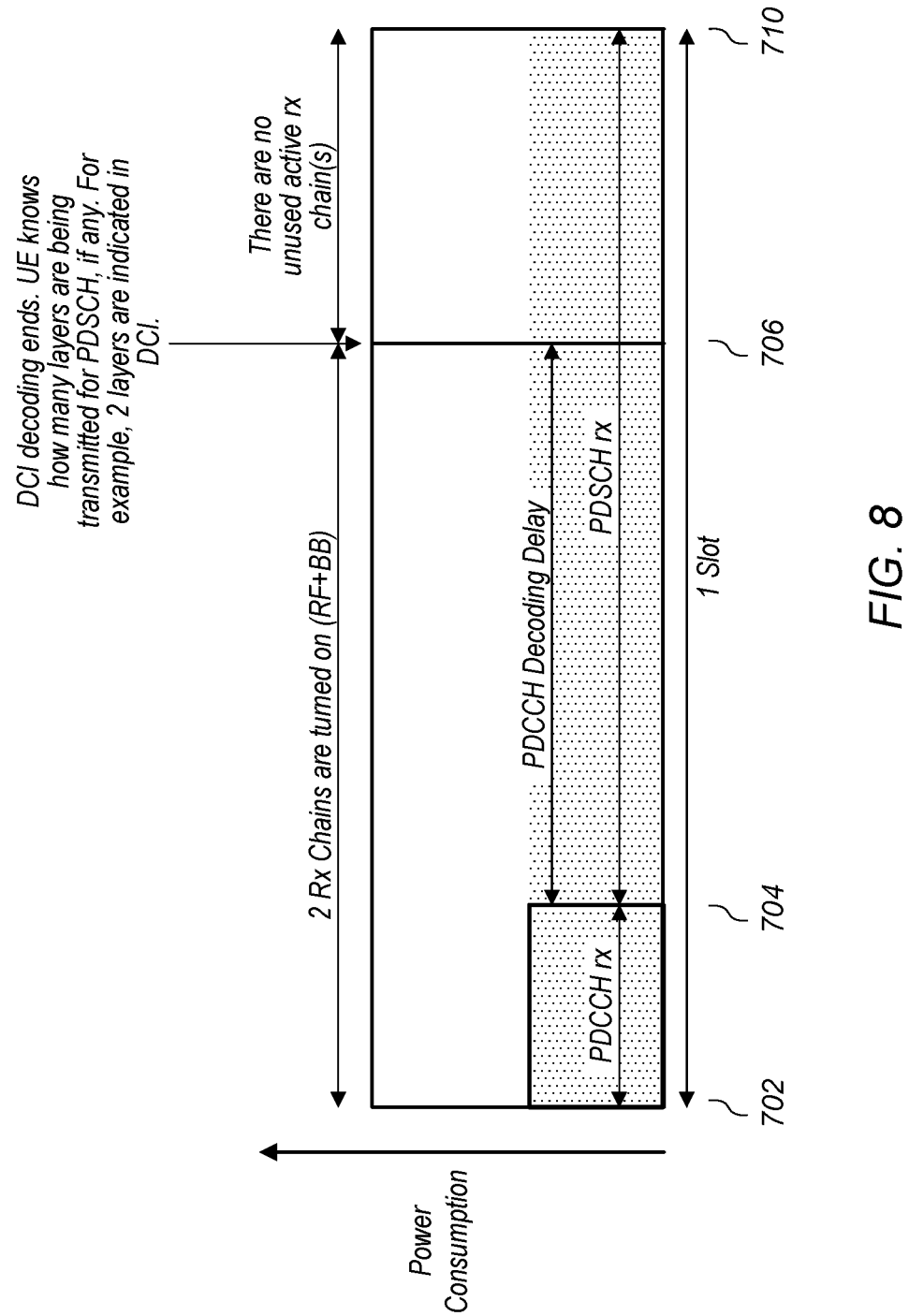

FIGS. 7 and 8—Graphs of Power Consumption

FIG. 7 illustrates the power consumption of a UE's receiver chains over the course of a slot, according to some embodiments. In the illustrated example, 1 codeword may be enabled, and a maximum number of 4 receiver (Rx) chains may be needed, e.g., according to existing technical specifications.

At the beginning of the slot (time 702 to 704), the UE may receive PDCCH using 4 Rx chains. The power consumption, illustrated by the shaded area, may be relatively high. The PDCCH may include DCI, including an indication of how many layers will be used for a PDSCH transmission later in the slot. The indication may be included in an antenna port field. The duration of the PDCCH reception may vary, but in some embodiments, the duration may be 1-3 OFDM symbols.

PDCCH reception may end and PDSCH reception may begin (time 704). The UE may continue to receive with 4 Rx chains and may continue to buffer the streams associated with 4 layers. The UE may decode PDCCH and DCI.

PDSCH reception may continue for the remaining time of the slot (e.g., until time 710).

The UE may finish decoding PDCCH (time 706), completing a PDCCH decoding delay. At this time, the UE may determine that, in the illustrated example, the antenna port field indicates that two layers are included in PDSCH. In other words, the UE may determine that only two layers are actually scheduled. Accordingly, the UE may begin to depower two receiver chains in order to save power. Depowering receiver chain components may take some time, as illustrated by the declining power consumption.

The process of depowering two receiver chains may complete (time 708), resulting in a relatively low power consumption for the remainder of the slot (e.g., until time 710). The UE may then repower the depowered receiver chains for (at least the beginning of) a subsequent slot or slots.

FIG. 8 is similar to FIG. 7. However, in comparison to FIG. 7, FIG. 8 illustrates some potential advantages of the techniques of FIG. 6, according to some embodiments. FIG. 8 illustrates the power consumption of a UE's receiver chains over the course of a slot, according to some embodiments. In the illustrated example, 1 codeword may be enabled, and a maximum number of 4 receiver (Rx) chains may be needed, e.g., according to existing technical specifications.

In contrast to FIG. 7, based on previously exchanged communication parameters, the UE may begin the slot illustrated in FIG. 8 with only two Rx chains active (702). The previously exchanged communication parameters may include an assignment to a BWP with a configured (e.g., adjusted, conditional) maximum of two MIMO layers, among various possibilities. In other words, $N_{max\_L\_k}$ may be two. Thus, the UE may receive PDCCH using 2 Rx chains (during time 702 to 704). The power consumption, illustrated by the shaded area, may be relatively low, e.g., approximately half of the corresponding power consumption illustrated in FIG. 7. The PDCCH may include DCI, including an indication of how many layers will be used for a PDSCH transmission later in the slot. The indication may be included in an antenna port field. The duration of the PDCCH reception may vary, but in some embodiments, the duration may be 1-3 OFDM symbols.

PDCCH reception may end and PDSCH reception may begin (time 704). The UE may continue to receive with 2 Rx chains and may continue to buffer the streams associated with 2 layers. The UE may decode PDCCH and DCI. PDSCH reception may continue for the remaining time of the slot (e.g., until time 710).

The UE may finish decoding PDCCH (time 706), completing a PDCCH decoding delay. At this time, the UE may determine that, in the illustrated example, the antenna port field indicates that two layers are included in PDSCH. In other words, the UE may determine that two layers are actually scheduled. Accordingly, the UE may determine that no adjustment to the number of active receiver chains is necessary to receive the scheduled layers. Thus, the number of active receiver chains (e.g., 2) and corresponding power consumption may remain (e.g., approximately) constant for the remainder of the slot (e.g., until time 710).

Although not shown in the illustrated example, it will be appreciated that the number of layers actually scheduled (e.g., as determined after the PDCCH decoding delay) may be less than $N_{max\_L\_k}$, in some circumstances. In such cases, the number of active receiver chains may be reduced following the PDCCH decoding delay until the end of the slot. The UE may then repower the depowered receiver chains for (at least a portion of) a subsequent slot or slots.

It will be appreciated that the relative timing and power consumption illustrated in FIGS. 7 and 8 is exemplary only.

Figure 9:
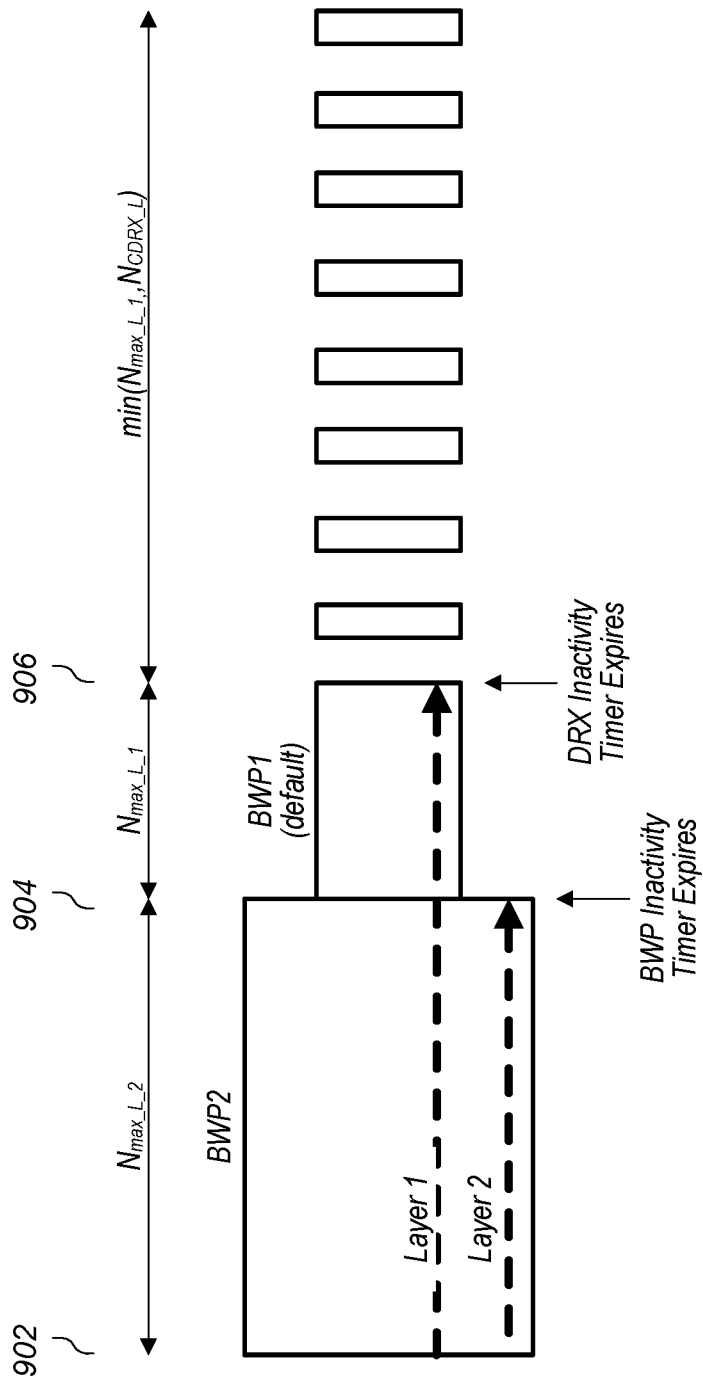
FIGS. 9 and 10 are timing diagrams illustrating bandwidth parts in relation to inactivity timers, according to some embodiments.
Figure 10:
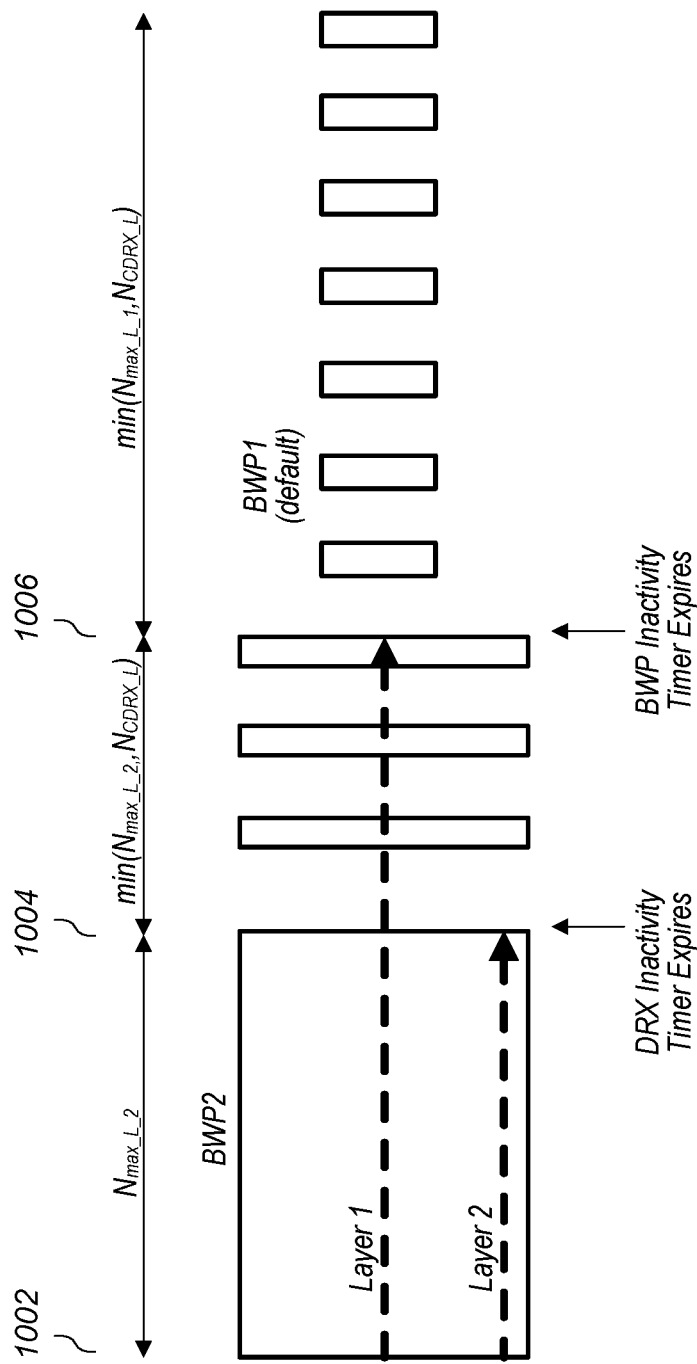

FIGS. 9 and 10—Bandwidth Parts and Inactivity Timers

In some embodiments, there may be one or more inactivity timers involved during BWP and CDRX operation in RRC connected mode. For example, a DRX inactivity timer (e.g., drx-InactivityTimer) may represent a length of time (e.g., a number of subframes) that the UE must remain active (e.g., continuously) following an uplink or downlink grant. A BWP inactivity timer (e.g., bwp-InactivityTimer) may represent the amount of time that a UE must use a first BWP (e.g., larger) BWP following an uplink or downlink grant prior to transitioning to a second (e.g., smaller) BWP. Note that the two BWPs may have different numbers of layers, e.g., the second BWP may be a default BWP, and may be configured for fewer layers than the first BWP. These timers may be configured separately (e.g., independently of each other, e.g., either timer may be shorter or longer than the other, or the timers may have the same duration). Note that additional or different timers may also be employed or that either of these timers may be employed without the other, according to some embodiments. For example, multiple BWP inactivity timers may be used, e.g., to schedule a series of steps to smaller BWPs, among various possibilities.

FIGS. 9 and 10 are timing diagrams (e.g., time may proceed from left to right) illustrating bandwidth parts and conditional maximum numbers of MIMO layers in relation to inactivity timers, according to some embodiments.

FIG. 9 illustrates a first case, in which a DRX inactivity timer may be longer than a BWP inactivity timer.

A first (e.g., most recent) grant may occur, and the DRX inactivity timer and BWP inactivity timers may be initiated (902). The UE may operate on a first BWP. The first BWP may be BWP2, e.g., as in the exemplary BWPs discussed above with respect to FIG. 6. Accordingly, the $N_{max\_L\_2}$ may be 2 and the UE may actively receive with 2 layers.

The BWP inactivity timer may expire (904). In response to expiration of the BWP inactivity timer, the UE may switch to a second BWP, e.g., BWP1, which may be a default BWP. Accordingly, the $N_{max\_L\_1}$ may be 1 and the UE may actively receive with a single layer. In other words, Layer 1 may continue to be used, but Layer 2 may no longer be used.

The DRX inactivity timer may expire (906). Accordingly, the UE may then begin operating in CDRX mode with repeating on durations and off durations according to DRX configurations. The UE may continue to operate on BWP1 using Layer 1. Note that the number of layers to be used may be expressed as $\min(N_{max\_L\_1}, N_{CDRX\_L})$. In the illustrated example, this expression may be equal to 1, e.g., because $N_{max\_L\_1}=1$. However, it should be appreciated that in some embodiments, expiration of the DRX inactivity may result in a reduction in the number of active layers, e.g., if $N_{CDRX\_L}$ is less than $N_{max\_L\_K}$.

FIG. 10 illustrates a second case, in which a DRX inactivity timer may be shorter than a BWP inactivity timer.

A first (e.g., most recent) grant may occur, and the DRX inactivity timer and BWP inactivity timers may be initiated (1002). The UE may operate on a first BWP. The first BWP may be BWP2, e.g., as in the exemplary BWPs discussed above with respect to FIG. 6. Accordingly, the $N_{max\_L\_2}$ may be 2 and the UE may actively receive with 2 layers.

The DRX inactivity timer may expire (1004). In response to expiration of the DRX inactivity timer, the UE may begin operating in CDRX mode with repeating on durations and off durations according to DRX configurations. The UE may continue to operate on BWP2, and may use a single layer (Layer 1) during the on durations. Again, the number of layers to be used may be determined as min($N_{max\_L\_1}$, $N_{CDRX\_L}$). In the case illustrated in FIG. 10, $N_{CDRX\_L}$ may equal 1. Thus, $N_{CDRX\_L}$ may be lower than $N_{max\_L\_1}$, and may therefore determine the number of layers. During a DRX On duration, data arrival may be sparse. Therefore, it may be advantageous to power only the minimum required number of Rx chains (1, in the illustrated example) to save power.

The BWP inactivity timer may expire (1006). Accordingly, the UE may then switch to a second BWP, e.g., BWP1, which may be a default BWP. Accordingly, the $N_{max\_L\_1}$ may be 1 and the UE may use a single layer to receive during CDRX on durations. The UE may continue to operate on BWP1. Thus, the number of layers used may not change, but the size of the BWP may decrease, in the illustrated example.

It will be appreciated that the relative timing, BWPs, and number of layers illustrated in FIGS. 9 and 10 is exemplary only.

Figure 11:
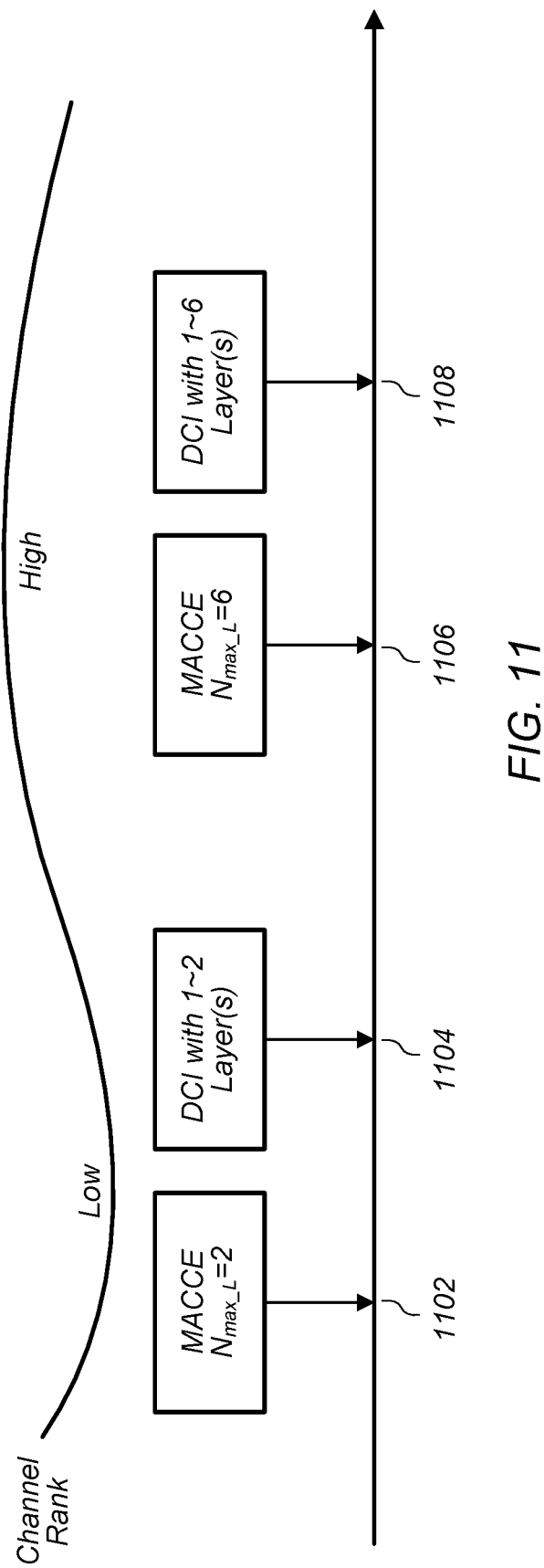
FIG. 11 is a timing diagram illustrating dynamic adjustment of number of layers, according to some embodiments.

FIG. 11—Dynamic Adjustment of Number of Layers

FIG. 11 is a timing diagram illustrating techniques for dynamically changing the maximum number of layers to be supported. In some embodiments, the number of layers may be adjusted without changing BWP. The maximum number of layers may be signaled from the BS to the UE using a MAC CE, or other suitable signaling mechanism (e.g., RRC, DCI, etc.). The maximum number of layers may remain in effect for any length of time, typically including more than one slot. DCI may also be used to indicate the actual number of layers used for any individual slot. Thus, some slots may still use fewer layers than the dynamically adjusted maximum number of layers. However, these techniques may allow the dynamically adjusted maximum number of layers and the number of layers used in at least some individual slots to track more closely, e.g., because the maximum can be adjusted independently of the number of codewords. For example, if one codeword is enabled, then one of 1, 2, 3, or 4 layers could be indicated as a dynamically adjusted maximum. If two codewords are enabled, then one of 1, 2, 3, 4, 5, 6, 7, or 8 layers could be indicated.

As illustrated, channel conditions (e.g., channel rank) may vary over time. Other indicators of channel quality or signal strength may be used (e.g., RSRP, SNR, etc.). At a first time, 1102, the BS may transmit a MAC CE to the UE dynamically setting a maximum number of layers to 2 (e.g., $N_{max\_L}=2$). Such an indication may be transmitted in response to declining channel rank, among various possibilities. Such an indication may be transmitted in response to a preference for a maximum number of layers indicated by the UE. Following the first indication, the BS may transmit any number of indications to the UE setting an actual number of layers for particular time periods (e.g., slots) (1104). For example, the indications may be DCI with antenna port fields. These indications may indicate 1 or 2 layers for each of the respective slots.

At a later time 1106, the BS may transmit a second indication (e.g., MAC CE) to the UE dynamically setting a maximum number of layers to 6 (e.g., $N_{max\_L}=6$). Such an indication may be transmitted in response to improving channel conditions, among various possibilities. Following the second indication, the BS may transmit any number of indications to the UE setting an actual number of layers for particular time periods (e.g., slots) (1108). For example, the indications may be DCI with antenna port fields. These indications may indicate 1-6 layers for each of the respective slots.

It will be appreciated that FIG. 11 is exemplary only, and that any number of indications may be transmitted and that other indicators may be used.

In the following, exemplary embodiments are provided.

In a first set of embodiments, a method for operating a base station may comprise: at the base station: establishing a wireless communication link with a user equipment device (UE); determining a first maximum number of multiple-input multiple-output (MIMO) layers for communication with the UE, wherein the first maximum number of MIMO layers is based on a number of codewords enabled for the UE; transmitting a first communication parameter to the UE, wherein the first communication parameter indicates the first maximum number of MIMO layers; determining an adjusted maximum number of MIMO layers for communication with the UE; transmitting a second communication parameter to the UE, wherein the second communication parameter indicates the adjusted maximum number of MIMO layers; and transmitting data to the UE using an actual number of MIMO layers less than or equal to the adjusted maximum number of MIMO layers.

In some embodiments, the second communication parameter may comprise an indication to the UE to use a first bandwidth part, wherein a configured maximum number of MIMO layers of the first bandwidth part is equal to the adjusted maximum number of MIMO layers.

In some embodiments, the first bandwidth part is a default bandwidth part, wherein the configured maximum number of MIMO layers of the first bandwidth part is equal to one.

In some embodiments, the second communication parameter comprises a maximum number of layers to receive during a connected mode discontinuous reception (CDRX) on duration.

In some embodiments, the adjusted maximum number of MIMO layers is based at least in part on one or more of: channel conditions; or a preference indication received from the UE.

In some embodiments, the second communication parameter comprises a media access control (MAC) control element (CE), wherein the adjusted maximum number of MIMO layers is based at least in part on channel conditions.

In some embodiments, the MAC CE is transmitted to the UE during a first slot, wherein the adjusted maximum number of MIMO layers is applicable to one or more second slots after the first slot, the method may further comprise: determining a third maximum number of MIMO layers for communication with the UE, wherein the third maximum number of MIMO layers is determined based at least in part on a change in channel conditions; transmitting a third communication parameter to the UE, wherein the third communication parameter indicates the third maximum number of MIMO layers, wherein the third maximum number of MIMO layers is applicable to one or more third slots after the one or more second slots; and transmitting data to the UE using a second actual number of MIMO layers less than or equal to the third maximum number of MIMO layers during the one or more third slots.

In some embodiments, the method may further comprise: transmitting downlink control information (DCI) to the UE, wherein the DCI comprises an indication of the actual number of MIMO layers.

In a second set of embodiments, a user equipment device (UE) configured for multiple-input multiple-output (MIMO) wireless communications, may comprise: a plurality of receiver chains configured to receive MIMO communications; a non-transitory computer-readable memory medium; and a processing element coupled to the plurality of receiver chains and the memory medium, wherein the processing element is configured to cause the UE to: establish communication with a base station; receive a first communication parameter from the base station; determine a maximum number of MIMO layers based on the first communication parameter; receive a second communication parameter from the base station; determine an adjustment to the maximum number of MIMO layers based on the second communication parameter; and adjust a number of active receiver chains based on the adjustment to the maximum number of MIMO layers.

In some embodiments, the UE may be further configured to: receive downlink control information (DCI) from the base station during a first slot, wherein the DCI comprises an indication of an actual number of MIMO layers from the base station, wherein the actual number of MIMO layers is less than or equal to the adjusted maximum number of MIMO layers; further adjust the number of active receiver chains based on the actual number of MIMO layers during the first slot, wherein said further adjusting comprises reducing the number of active receiver chains by depowering at least one active receiver chain; and repowering the at least one active receiver chain for at least a portion of a subsequent slot.

In some embodiments, the UE may be further configured to: receive data from the base station using the number of active receiver chains.

In some embodiments, the UE may be further configured to: indicate to the base station a number of codewords supported by the UE, wherein the first maximum number of MIMO layers is associated with the number of codewords.

In some embodiments, the UE may be further configured to: indicate to the base station a preferred maximum number of MIMO layers, wherein the adjusted maximum number of MIMO layers is equal to the preferred maximum number of MIMO layers.

In some embodiments, the UE may be further configured to: perform one or more measurements of channel conditions, wherein the preferred maximum number of MIMO layers is based on the one or more measurements of channel conditions.

In some embodiments, an apparatus, may comprise a processing element configured to cause a wireless device to: establish communication with a base station; receive at least one communication parameter from the base station; dynamically determine a maximum number of multiple-input multiple-output (MIMO) layers based on the at least one communication parameter; depower at least a first receiver chain of a plurality of receiver chains based on the maximum number of MIMO layers, wherein a first subset of the plurality of receiver chains remain powered; and receive data from the base station using the first subset of the plurality of receiver chains.

In some embodiments, the maximum number of MIMO layers is further based on at least one inactivity timer.

In some embodiments, the at least one inactivity timer may comprise: a discontinuous reception (DRX) inactivity timer; and a bandwidth part (BWP) inactivity timer.

In some embodiments, the at least one communication parameter comprises: a maximum number of layers for a first BWP; and a maximum number of layers for a second BWP.

In some embodiments, the at least one communication parameter comprises: a maximum number of layers for a connected mode discontinuous reception (CDRX) on duration.

In some embodiments, the processing element may be further configured to cause the wireless device to: receive a second communication parameter from the base station, wherein the second communication parameter is received via a media access control (MAC) control element (CE); dynamically determine a second maximum number of MIMO layers based on the second communication parameter; depower at least a further receiver chain of the plurality of receiver chains based on the second maximum number of MIMO layers; and receive second data from the base station using at least a second subset of the plurality of receiver chains, wherein the second subset contains fewer receiver chains than the first subset.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
at a base station:
establishing a wireless communication link with a user equipment device (UE);
receiving, from the UE, a preference for a maximum number of multiple-input multiple-output (MIMO) layers for power savings at the UE;
configuring a first Bandwidth Part (BWP), wherein a configuration of the first BWP includes a first maximum number of MIMO layers specific to the first BWP;
configuring a second BWP, wherein a configuration of the second BWP includes a second maximum number of MIMO layers specific to the second BWP, wherein the second maximum number of MIMO layers is less than the first maximum number of MIMO layers;
transmitting, to the UE, data using the first BWP and using a first number of MIMO layers less than or equal to the first maximum number of MIMO layers;
transmitting, to the UE, an indication to switch to the second BWP configured with the second maximum number of MIMO layers to enable the power savings at the UE;
transmitting, to the UE, downlink control information, wherein the downlink control information indicates an actual number of MIMO layers less than or equal to the second maximum number of MIMO layers; and
transmitting data to the UE using the actual number of MIMO layers.

2. The method of claim 1, wherein the first bandwidth part is a default bandwidth part, wherein the first maximum number of MIMO layers is equal to one.

3. The method of claim 1, the method further comprising transmitting a second communication parameter to the UE, wherein the second communication parameter comprises a maximum number of layers to receive during a connected mode discontinuous reception (CDRX) on duration.

4. The method of claim 1, wherein the second maximum number of MIMO layers is less than or equal to the maximum number of layers for power savings at the UE.

5. The method of claim 1, the method further comprising transmitting a second communication parameter to the UE, wherein the second communication parameter comprises a media access control (MAC) control element (CE), wherein said transmitting the indication to switch to the second BWP is based at least in part on channel conditions.

6. The method of claim 5, wherein the MAC CE is transmitted to the UE during a first slot, wherein the second maximum number of MIMO layers is applicable to one or more second slots after the first slot,
the method further comprising:
determining a third maximum number of MIMO layers for communication with the UE, wherein the third maximum number of MIMO layers is determined based at least in part on a change in channel conditions;
transmitting a third communication parameter to the UE, wherein the third communication parameter indicates the third maximum number of MIMO layers, wherein the third maximum number of MIMO layers is applicable to one or more third slots after the one or more second slots;
transmitting, to the UE, second downlink control information indicating a second actual number of MIMO layers less than or equal to the third maximum number of MIMO layers; and
transmitting data to the UE using the second actual number of MIMO layers during the one or more third slots.

7. An apparatus, comprising:
a processor configured to cause a user equipment device (UE) to:
establish communication with a base station;
transmit, to the base station, a preference for a maximum number of multiple-input multiple-output (MIMO) layers for power savings at the UE;
receive, from the base station, a first communication parameter;
determine a maximum number of MIMO layers for a first bandwidth part, BWP, based on the first communication parameter;
receive, from the base station, a second communication parameter;
determine a second maximum number of MIMO layers for a second BWP based on the second communication parameter;
receive, from the base station, an indication to switch to the second BWP configured with the second maximum number of MIMO layers, wherein the switch to the second BWP configured with the second maximum number of MIMO layers enables the power savings at the UE;
receive, from the base station, downlink control information (DCI) indicating an actual number of MIMO layers equal to or less than the second maximum number of MIMO layers; and
receive, from the base station, downlink data using the actual number of MIMO layers.

8. The apparatus of claim 7, wherein the second maximum number of MIMO layers is less than or equal to the maximum number of layers for power savings at the UE.

9. The apparatus of claim 7, wherein the processor is further configured to cause the UE to:
indicate to the base station a number of codewords supported by the UE, wherein the first maximum number of MIMO layers is associated with the number of codewords.

10. The apparatus of claim 9, wherein the maximum number of MIMO layers for power savings at the UE is based on one or more measurements of channel conditions.

11. The apparatus of claim 7, wherein the processor is further configured to cause the UE to:
determine a dynamic maximum number of MIMO layers.

12. The apparatus of claim 11,
wherein the dynamic maximum number of MIMO layers is further based on at least one inactivity timer, wherein the at least one inactivity timer includes a BWP inactivity timer.

13. The apparatus of claim 12, wherein the at least one inactivity timer further includes a discontinuous reception (DRX) inactivity timer, wherein at least one of the first communication parameter and/or the second communication parameter includes a maximum number of layers for a connected mode discontinuous reception (CDRX) on duration.

14. The apparatus of claim 11, wherein the processor is further configured to cause the UE to:
receive a further communication parameter from the base station, wherein the further communication parameter is received via a media access control (MAC) control element (CE); and adjust the dynamic maximum number of MIMO layers based on the further communication parameter, wherein the processor is further configured to cause the UE to:
depower at least one receiver chain plurality of receiver chains based on the adjustment to the dynamic maximum number of MIMO layers.

15. A user equipment device (UE), comprising:
a radio; and
a processor operably connected to the radio and configured to cause the UE to:
establish communication with a base station;
transmit, to the base station, a preference for a maximum number of multiple-input multiple-output (MIMO) layers for power savings at the UE;
receive, from the base station, a first communication parameter;
determine a maximum number of MIMO layers for a first bandwidth part, BWP, based on the first communication parameter;
receive, from the base station, a second communication parameter;
determine a second maximum number of MIMO layers for a second BWP based on the second communication parameter;
receive, from the base station, an indication to switch to the second BWP configured with the second maximum number of MIMO layers, wherein the switch to the second BWP configured with the second maximum number of MIMO layers enables the power savings at the UE;
receive, from the base station, downlink control information (DCI) indicating an actual number of MIMO layers equal to or less than the second maximum number of MIMO layers; and
receive, from the base station, downlink data using the actual number of MIMO layers.

16. The UE of claim 15, wherein the DCI is received from the base station during a first slot, wherein the processor is further configured to cause the UE to:
depower at least one active receiver chain during the first slot, wherein the downlink data is received during the first slot and subsequent to said depowering; and
repower the at least one active receiver chain for at least a portion of a subsequent slot.

17. The UE of claim 15, wherein the maximum number of layers for power savings at the UE is greater than or equal to the second maximum number of MIMO layers.

18. The UE of claim 17, wherein the second maximum number of MIMO layers is equal to the maximum number of MIMO layers for power savings at the UE.

19. The UE of claim 15, wherein the processor is further configured to cause the UE to:
determine a dynamic maximum number of MIMO layers.

20. The UE of claim 19,
wherein the dynamic maximum number of MIMO layers is further based on at least one inactivity timer, wherein the at least one inactivity timer includes a BWP inactivity timer.

* * * * *